United States Patent
Persson et al.

(10) Patent No.: US 7,188,544 B2
(45) Date of Patent: Mar. 13, 2007

(54) INDUSTRIAL ROBOT

(75) Inventors: Fredrik Persson, Västerås (SE); Hakan Hvittfeldt, Västerås (SE); Jan Larsson, Västerås (SE); Pierre Mikaelsson, Västerås (SE)

(73) Assignee: ABB AB, Vasteras (SE)

( * ) Notice: Subject to any disclaimer, the term of this patent is extended or adjusted under 35 U.S.C. 154(b) by 619 days.

(21) Appl. No.: 10/700,057

(22) Filed: Nov. 4, 2003

(65) Prior Publication Data

US 2004/0143876 A1 Jul. 22, 2004

Related U.S. Application Data

(63) Continuation-in-part of application No. 09/857,349, filed on Jul. 30, 2001, now abandoned.

(30) Foreign Application Priority Data

Dec. 3, 1998 (SE) .................................... 9804214

(51) Int. Cl.
*B25J 17/00* (2006.01)
(52) U.S. Cl. ........................ 74/490.03; 901/15; 901/28
(58) Field of Classification Search ............. 74/490.01, 74/490.03, 490.05, 490.06; 901/14, 15, 23, 901/27, 28

See application file for complete search history.

(56) References Cited

U.S. PATENT DOCUMENTS

| 5,740,699 | A | * | 4/1998 | Ballantyne et al. | ....... 74/490.06 |
|---|---|---|---|---|---|
| 6,602,042 | B2 | * | 8/2003 | Roy et al. | .................... 414/735 |
| 6,648,583 | B1 | * | 11/2003 | Roy et al. | .................... 414/735 |
| 6,766,711 | B2 | * | 7/2004 | Hvittfeldt et al. | ......... 74/490.05 |
| 2003/0053901 | A1 | * | 3/2003 | Roy et al. | .................... 414/735 |
| 2003/0121350 | A1 | * | 7/2003 | Hvittfeldt et al. | ......... 74/490.01 |
| 2004/0149065 | A1 | * | 8/2004 | Moran | ..................... 74/490.04 |

* cited by examiner

*Primary Examiner*—David M. Fenstermacher
(74) *Attorney, Agent, or Firm*—Dykema Gossett PLLC

(57) ABSTRACT

An industrial delta robot with an arm system rotatable in space and including a base section, a moveable plate, several multi-jointed pull rods and a telescopic axle arranged between the base section and the moveable plate, opposite ends of the pull rods and of the telescopic axle being connected with the base section and the moveable plate respectively, and the telescopic axle comprising an inner axle and an outer tube arranged on the inner axle and displaceable in a longitudinal direction where a pair of end-to-end torsional rigid bushings are arranged in a stationary manner on the outer tube in which the inner axle is mounted to be displaceable, the bushings being spaced apart at confronting inner ends to form a transversely extending lubrication pocket for continuous lubrication of the inner axle during movement relative to the bushings.

9 Claims, 3 Drawing Sheets

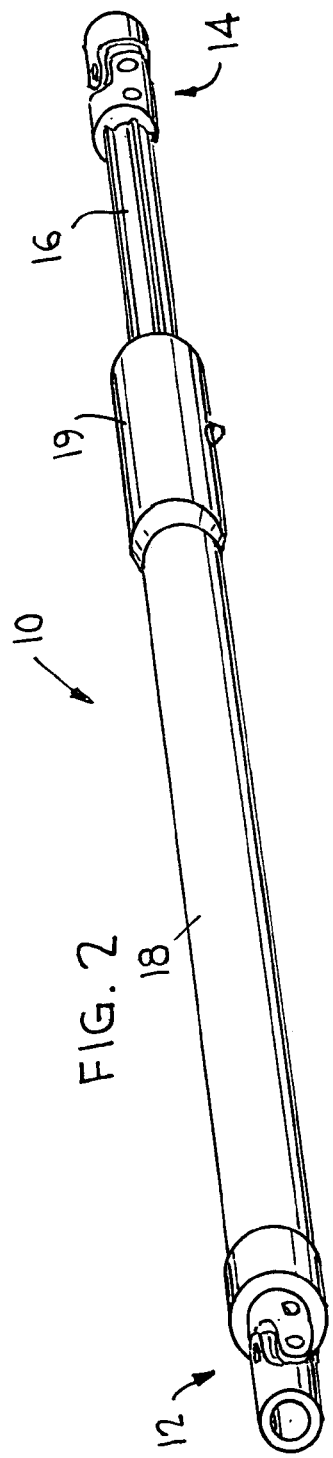
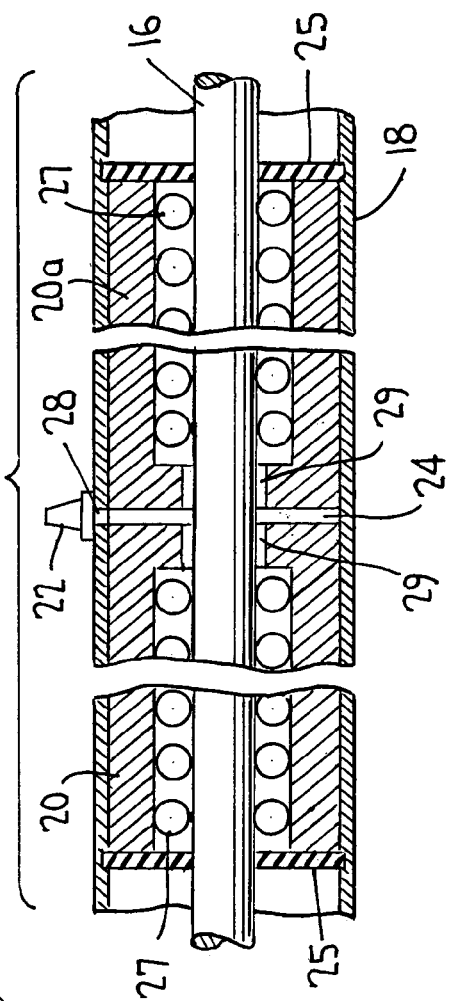
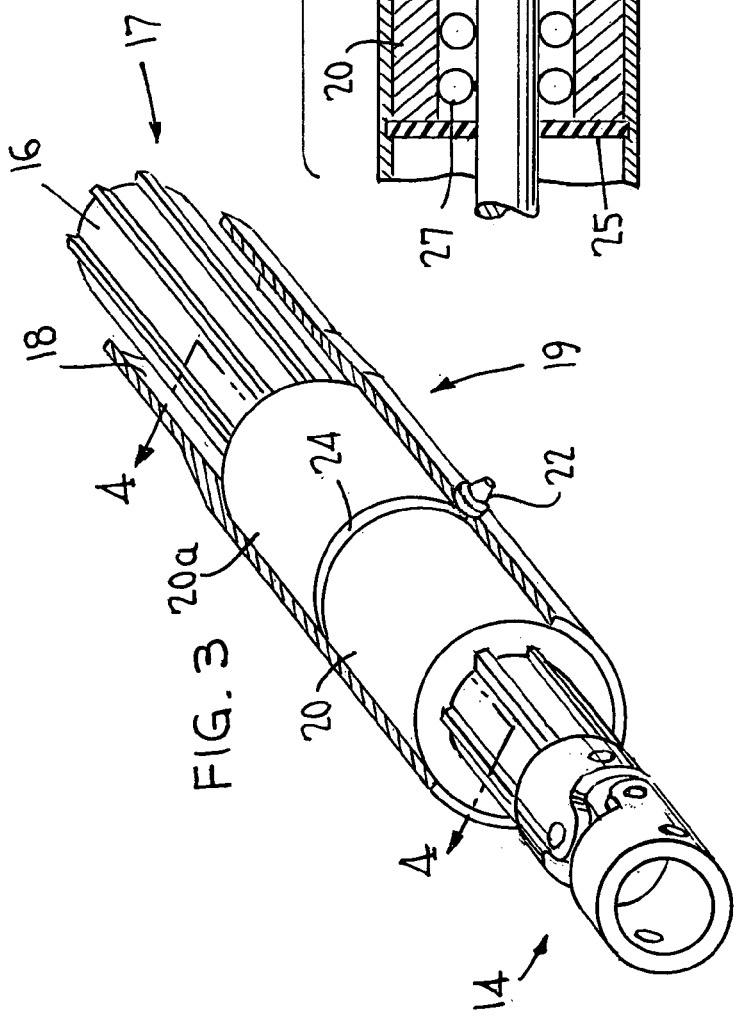

INDUSTRIAL ROBOT

RELATED APPLICATION

This Continuation-In-Part application claims benefit of priority of U.S. application Ser. No. 09/857,349, filed Jul. 30, 2001 now abandoned.

TECHNICAL FIELD

The present invention relates to an industrial robot according to the delta concept with an arm system. The present invention also relates to a pair of end-to-end torsional rigid bushings and, in an alternative solution, to the bushings and a guiding device on a telescopic axle for an industrial robot according to the delta concept, as well as to the use of the bushings and alternatively the guiding device for an industrial robot. The present invention also relates to a method for an industrial robot according to the delta concept with an arm system intended to rotate in space.

BACKGROUND

The use of industrial robots for the flexible automation of industrial processes has become increasingly common for replacing time consuming, monotonous and difficult work. Such work can, for example, be transferring pieces of chocolate or similar objects from a conveyor belt to places in predetermined locations in, for example, boxes, with high speed and precision where the object is moving on a separate conveyor belt. The ability to be able to handle small and delicate objects effectively with great speed and precision is much sought after in the automation of industrial processes. For this purpose, and for others, an industrial robot has been designed according to the so-called delta concept, where the objective is to achieve rotation of lifted objects to a parallel robot structure. This type of robot, a so-called delta robot, can, for example, be placed in a frame construction above a conveyor belt, and have an arm system to which tools intended to rotate in space, i.e., rotate with three degrees of freedom in x, y and z directions, can be attached. By rotating the robot arm as mentioned later below, it is intended that the robot arm also performs a rotational movement. The arm system commonly comprises a base section, a movable plate and, between them, several jointed pull rods. It is primarily the pull rods that take up the load. A telescopic axle, also called a fourth axle, is arranged between the base section and the moveable plate. Its task is to act as a driving axle from a motor in the robot structure to a tool arranged on the moveable plate. The rotation should have minimal loose play and be able to be carried out in free space, i.e., the distance from the moveable plate to the base of the robot, the base section, is variable. The linear movement can have a speed up to 10 m/s. The number of "pick-ups" of objects can be 120 pieces per minute, which is equivalent to 2 per second. In addition, this delta robot is usually equipped with a system that visually identifies defective objects and only selects those that are perfect.

One problem with this robot is that friction and loose play arises between the integral parts during the rotational movement of the arm system. The telescopic axle must respectively decrease or increase its length at the same time as it is to transfer relatively large moments with great precision, high speed/acceleration, irrespective of whether the object to be picked up is placed at random on the conveyor belt or whether its position is controlled. With known telescopic arms for industrial robots according to the delta concept, an outer tube is joined to an inner axle with an ordinary sliding joint, for example, in the form of splines or similar means, which leads to loose play in the transfer of moments and that is not able to handle moments greater than about 0.5 Nm at moderate speeds.

An industrial robot according to the delta concept with an arm system that comprises a telescopic axle is previously known from U.S. Pat. No. 4,976,582.

DISCLOSURE OF THE INVENTION

The present invention aims to achieve a device for an industrial robot that is more effective and faster than conventional designs. The objective of the invention is, for a telescopic arm, to allow a low friction moment-transferring movement that is free of loose play and that is parallel. One goal of the present invention is thus to be able to perform a rotational movement in space with minimal friction, without loose play and with maximum rigidity with an arm system for an industrial robot. The rotational movement should be able to be performed at high speeds and acceleration and with relatively large moments.

The solution is achieved by an industrial robot with the characteristics set forth in one or more of the appended claims. More specifically, the present invention relates to an industrial robot according to the delta concept with an arm system intended to rotate in space and that comprises a base section, a moveable plate, several multi-jointed pull rods and a telescopic axle arranged between the base section and the moveable plate, where opposite ends of the pull rods and the telescopic axle are connected with the base section and the moveable plate respectively, and where the telescopic axle comprises an inner axle and an outer tube arranged on the inner axle and displaceable in a longitudinal direction, where a pair of end-to-end torsional rigid bushings are arranged in a stationary manner on the outer tube in which the inner axle is mounted to be displaceable. One advantage with this solution is that a very torsional rigid design is achieved where a telescopic axle with a low friction moment-transferring movement that is free of loose play and parallel is obtained. The design can handle large moments in excess of 1 Nm and linear speeds of up to 10 m/s. A further advantage is that friction and loose play are minimized, whereby the robot can perform rotational movements with high speed and great precision.

The present invention also includes a guiding device for a telescopic axle for an industrial robot according to the delta concept. The inner axle usually has a free axle end that is not fixed. When the telescopic axle decreases/increases in length, the inner axle moves parallel with the outer tube. There is then a risk that the inner axle will come into contact with the inside of the outer tube, which causes wear and dissonance. A further disadvantage is that a loading, a breaking force, occurs on the said torsional rigid bushing in that the inner axle tilts around the bushing. This problem is solved according to the present invention with an industrial robot which provides an arm system intended to rotate in space that comprises a base section, a moveable plate, several multi-jointed pull rods and a telescopic axle arranged between the base section and the moveable plate, where opposite ends of the pull rods and the telescopic axle are connected with the base section and the moveable plate respectively, and where the telescopic axle comprises an inner axle and an outer tube arranged on the inner axle and displaceable in a longitudinal direction, where a torsional rigid bushing in a stationary manner on the outer tube in which the inner axle is mounted to be displaceable is arranged, and also a guiding device that is firmly attached to the inner axle, whereby one part of the guiding device is arranged to abut the inside of the outer tube. One advantage with this solution is that a telescopic axle is achieved that eliminates problems of wear and dissonance, at the same time as a very torosional rigid design with reduced friction and loose play is achieved. Due to the solution with the guiding device, the parts of the telescopic arm, the inner axle and the outer tube, move parallel in relation to one another. The inner axle is prevented from tilting and causing a breaking force on the bushing.

The torsional end-to-end rigid bushings can, for example, be joined to the inner axle. In this situation, it is appropriate that ball bearings or similar means be arranged within the bushing, where the bearings can be located in grooves in the inner axle. One or more balls can, in this case, be arranged in each respective groove. The bushings are preferably moment ball bushings. The bushings and guiding device respectively can be designed in material suitable for the purpose such as thin steel plate, aluminum or plastic. In order for the guiding device to able to handle the wear that occurs, it is appropriate to mould it from a polymer such as POM, PE or PA.

The guiding device can be designed as a disc, several shoulders, an annular sleeve or the like. According to one embodiment, the guiding device is disc-shaped and is provided with through cavities in the thickness direction of the disc to allow air to pass through.

The present invention also comprises a method for an industrial robot according to the delta concept with an arm system intended to rotate in space, whereby in the arm system a base section and a moveable plate are arranged, several multi-jointed pull rods and a telescopic axle are arranged between the base section and the moveable plate, where opposite ends of the pull rods and the telescopic axle are connected with the base section and the moveable plate respectively, and where the telescopic axle comprises an inner axle and an outer tube arranged on the inner axle and displaceable in a longitudinal direction plus that end-to-end torsional rigid bushings are arranged in a stationary manner on the outer tube in which the inner axle is mounted to be displaceable.

The present invention also refers to a method for an industrial robot according to the delta concept with an arm system intended to rotate in space, whereby in the arm system a base section and moveable plate are arranged, multi-jointed pull rods and a telescopic axle are arranged between the base section and the moveable plate, where opposite ends of the pull rods and the telescopic axle are connected with the base section and the moveable plate respectively, and where the telescopic axle comprises an inner axle and an outer tube arranged on the inner axle and displaceable in a longitudinal direction, whereby end-to-end torsional rigid bushings are arranged in a stationary manner on the outer tube in which the inner axle is mounted to be displaceable, and also that a guiding device is firmly attached to the inner axle, whereby one part of the said guiding device is arranged to abut the inside of the outer tube.

The present invention also includes use of the bushings and a guiding device for an industrial robot according to the delta concept with a telescopic axle.

The described industrial robot, that can also be termed manipulator with controlling 15 apparatus, is according to the present invention intended to be able to handle loads of up to at least 1 kg.

DESCRIPTION OF THE DRAWINGS

The invention is described in greater detail in the form of a non-limiting example of an embodiment according to the present invention and clarified with the aid of the enclosed drawings, where

FIG. 2 is a perspective view of a telescopic axle for an industrial robot which incorporates the invention.

FIG. 3 is view similar to FIG. 2 of a pair of end-to-end torsional rigid bushings arranged on a telescopic axle in a partly sectioned perspective view.

FIG. 4 is a sectional view taken substantially along the line 4—4 of FIG. 3.

DESCRIPTION OF EMBODIMENTS

Figure 1:
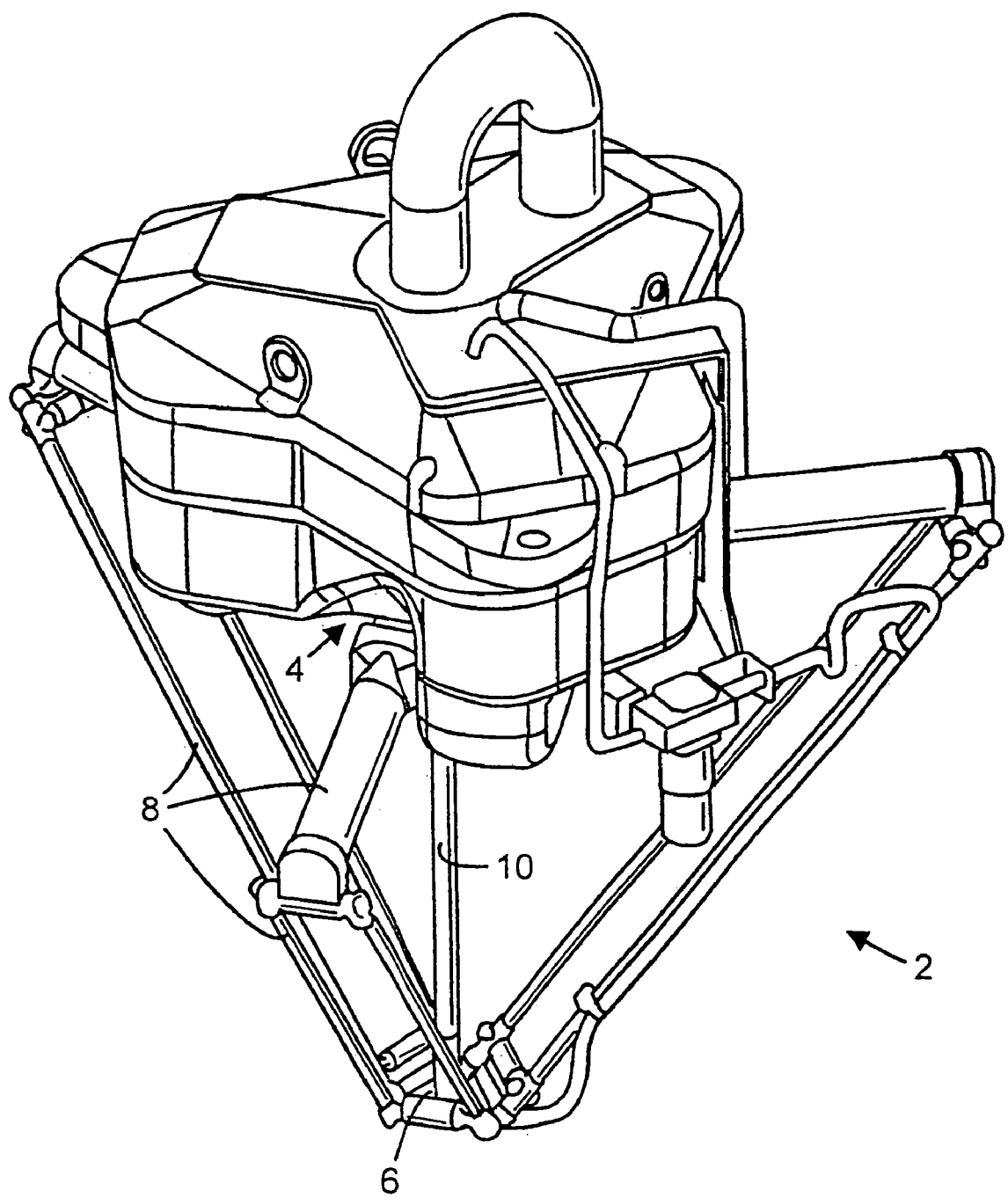
FIG. 1 is a perspective view of an industrial robot according to the delta concept.

FIG. 1 shows an industrial robot according to the delta concept. The industrial robot is designed with an amt system 2 intended to rotate in the space. A number of jointed pull rods 8 are arranged on a moveable plate 6 at their end sections. The jointed pull rods are arranged to a generally designated base section 4 of the robot at their opposite end sections. A tool is intended to be arranged on the moveable plate 6. A fourth axle in the font of a telescopic axle 10 is arranged between the base section and the moveable plate where the opposite ends of the telescopic axle 10 (see FIG. 2) and the respective pull rods 8 are connected with the base section and the moveable plate respectively. The task of the telescopic axle is to act as a driving axle from a motor in the robot structure to a tool arranged on the moveable plate. At one end, the telescopic axle is arranged in a stationary manner on base section 4 and at its other end is able to move freely when it is arranged at moveable plate 6. The whole of the telescopic axle can move forwards and backwards at very high speeds. The rotation takes place in the space, i.e. the distance from moveable plate 6 to base section 4 is variable.

FIG. 2 is a view of a telescopic axle 10 that comprises an inner axle 16 with an end section 14 and an outer tube 18 with an end section 12 arranged on the inner axle and displaceable in a longitudinal direction. Outer tube 18 is designed with a thicker, sleeve shaped section 19 that surrounds a pair of end-to-end torsional rigid bushings 20, 20a (see FIG. 3) arranged at inner axle 16. Thus, the torsional rigid bushing 20 is arranged in a stationary manner in outer tube 18, in which the inner axle is displaceable. According to one embodiment, outer tube 18 with end section 12 can be arranged on moveable plate 6 (see FIG. 1) and inner axle 16 with end section 14 can be arranged on base section 4 of the robot.

In the illustration according to FIG. 3, it can be seen that a telescopic axle 10 with a pair of end-to-end torsional rigid bushings 20, 20a are firmly attached to outer tube 18 and surround inner axle 16. The torsional rigid bushings can, for example, be mounted to the inner axle, whereby ball bearings or the like (FIG. 4) are placed in grooves 17 on the inner axle and arranged within the bushings. Grooves 17 also act to guide the bushing during the displacement of inner axle 16 in the bushings. As shown in the Figure, the bushings can each be in the form of an annular-shaped sleeve. On this, a lubrication nipple 22 is arranged, and at the location of lubrication nipple 22, the bushings are slightly spaced apart to form a transversely extending lubrication pocket 24 intended to accommodate excess lubricant for continuous lubrication of the inner axle during movement relative to the bushings.

As shown in more detail in FIG. 4, bushings 20, 20a are mounted on inner axle 16 end-to-end at a slight distance apart, the distance chosen related to the amount of lubricant needed. The spacing at the confronting inner ends of the bushings defines an annular gap 24 which forms a transversely extending lubrication pocket for continuous lubrication of the inner axle during movement relative to the bushings. Gap 24 is in alignment with a lubrication opening 28 in outer tube 18, and a lubrication nipple 22 overlies opening 28. Each bushing has a ball bearing set 27 which functions as anti-friction means between the bushings and axle 16. And, grooves 29 or the like in the bushings at their confronting inner ends are in communication with gap 24 to feed lubricant to each ball bearing set. Further, end seals 25 are provided at the outer ends of the bushings, the end seals having central openings through which axle 16 extends.

Bushings 20, 20a can be of relatively small size which, as compared to the use of a single bushing, improved stability is possible due to the improved and increased allowable limit static rated moment.

The industrial delta robot according to the invention is redundant on rotational torque which enables use of a small dimension inner axle 16. This in turns allow for the reduction of the dimension of the telescopic axle which decreases the weight of the industrial robot itself. This is quite important since the robot is expected to carry out one stroke in 0.2 seconds. A reduced design of both the inner axle and the bushings result in decreased costs for producing the robot while at the same time increasing its efficiency. The telescopic axle is more stable and the robot according to the invention requires less down time for services because of its increased efficiency.

Figure 5:
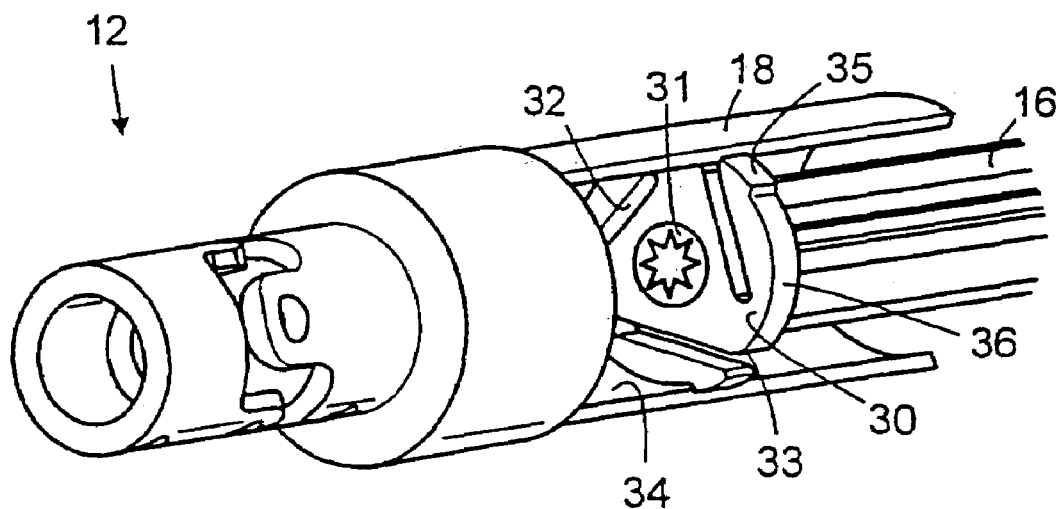
FIG. 5 is a view similar to FIG. 3 of a guiding device arranged on a telescopic axle in a partly sectioned perspective view.
Figure 6:
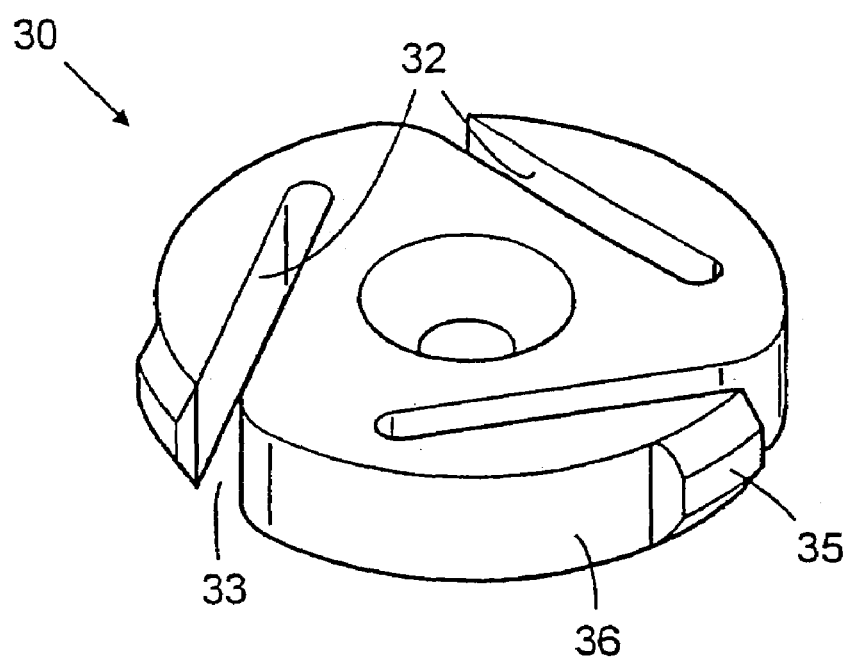
FIG. 6 is a perspective view of the guiding device of FIG. 5.

FIG. 5 illustrates a partially sectioned view of a guiding device 30 arranged on inner axle 16, preferably firmly attached to free end 31 of in the inner axle at a telescopic axle 10 (see FIGS. 1–2). As is also evident from FIG. 6, guiding device 30 can also be disc-shaped and be designed with through cavities 32 in the thickness direction of the disc to reduce air resistance, where cavities 32 in a radial direction can suitably be through channels that extend outwards and that are open at the periphery 33 of the guiding device, which allows the guiding device to be resilient against the outer tube when the guiding device is arranged to be pre-tensioned against the outer tube. The guiding device can be designed with several cavities 32. One section of the said guiding device is arranged to abut the inside or inner wall 34 of the inner tube. The guiding device can suitably be provided with shoulders 35 with bevelled edges intended to abut the inside 34 of the inner tube, and recess sections 36, to minimize the risk of skewing due to friction. Shoulders 35 can, for example, comprise three or four shoulders evenly spaced around the periphery of the guiding device. The guiding device is preferably arranged centrally within the outer tube. In addition, it is appropriate to arrange the guiding device pre-tensioned within the outer tube, which means that the diameter of the guiding device is somewhat greater than the inner diameter of the outer tube so that the guiding device presses against the inside 34 of the outer tube.

What is claimed is:

1. An industrial delta robot having an arm system rotatable in space, comprising a base section, a moveable plate, several multi-jointed pull rods and a telescopic axle arranged between the base section and the moveable plate, opposite ends of the pull rods and the telescopic axle being respectively connected with the base section and the moveable plate, the telescopic axle comprising an inner axle and an outer tube arranged on the inner axle and displaceable in a longitudinal direction, and wherein a pair of end-to-end torsional rigid bushings are arranged in a stationary manner on the outer tube in which the inner axle is mounted to be displaceable, confronting inner ends of the bushings being slightly spaced apart to define an annular gap forming a transversely extending lubrication pocket for continuous lubrication of the inner axle during movement relative to the bushings.

2. The industrial delta robot according to claim 1, wherein the inner axle has axial grooves that guide the inner axle during displacement in the torsional rigid bushings.

3. The industrial delta robot according to claim 1, wherein the outer tube is arranged on the moveable plate and the inner axle is arranged on the base.

4. A method for the manufacture of an industrial delta robot having an arm system rotatable in space, comprising the steps of: arranging a base section and a moveable plate in the arm system; arranging several multi-jointed pull rods and a telescopic axle between the base section and the moveable plate; connecting the opposite ends of the pull rods and the telescopic axle respectively with the base section and the moveable plate, the telescopic axle comprising an inner axle and an outer tube arranged on the inner axle and displaceable in a longitudinal direction, arranging a pair of end-to-end torsional rigid bushings in a stationary manner on the outer tube in which the inner axle is mounted to be displaceable, spacing the confronting inner ends of the bushings apart to define an annular gap forming a transversely extending lubrication pocket, and continuously lubricating the inner axle through the pocket during movement relative to the bushings.

5. An industrial delta robot having an arm system rotatable in space, comprising a base section, a moveable plate, several multi-jointed pull rods and a telescopic axle arranged between the base section and the moveable plate, opposite ends of the pull rods and of the telescopic axle being respectively connected with the base section and the moveable plate, the telescopic axle comprising an inner axle and an outer tube arranged on the inner axle and displaceable in a longitudinal direction, an end section of the outer tube being connected to the moveable plate and an end section of the inner axle being connected to the base section, a pair of end-to-end torsional rigid bushings being arranged in a stationary manner on the outer tube in which the inner axle is mounted to be displaceable, the bushings being spaced apart at confronting inner ends to form a transversely extending lubrication pocket for continuous lubrication of the inner axle during movement relative to the bushings, the bushings and a guiding device being firmly attached on the inner axle at an end opposite the end section thereof such that part of the guiding device is arranged to abut the inside of the outer tube.

6. An industrial delta robot according to claim 5, wherein the guiding device is arranged pre-tensioned against the inside of the outer tube.

7. An industrial delta robot according to claim 5, wherein the outer tube is arranged on the moveable plate and the inner axle is arranged on the base section.

8. An industrial delta robot according to claim 5, wherein the guiding device is disc-shaped.

9. An industrial delta robot according to claim 5, wherein the guiding device comprises at least three shoulders that abut the inside of the outer tube and which are evenly spaced around the periphery of the guiding device.

* * * * *